United States Patent

[11] 3,545,454

| [72] | Inventors | Ian Kjaer |
| | | Allerod, Denmark; |
| | | Dieter Neuber, Jakobsberg, Sweden |
| [21] | Appl. No. | 765,844 |
| [22] | Filed | Oct. 8, 1968 |
| [45] | Patented | Dec. 8, 1970 |
| [73] | Assignee | Arenco Aktiebalag |
| [32] | Priority | Oct. 13, 1967 |
| [33] | | Sweden |
| [31] | | No. 14,080/67 |

[54] DEVICE IN A MACHINE FOR PRODUCING CIGAR BUNCHES OR CIGARS
1 Claim, 8 Drawing Figs.

[52] U.S. Cl. ................................................ 131/61, 131/20
[51] Int. Cl. ........................................................ A24c 01/02, A24c 05/18, A24c 05/39
[50] Field of Search ........................................... 131/161, 161(A), 61(B), 20(A)

[56] References Cited
UNITED STATES PATENTS

| 2,160,201 | 5/1939 | Edwards ...................... | 131/61(A) |
| 2,236,579 | 4/1941 | Rundell ....................... | 131/61(A) |
| 2,742,907 | 4/1956 | Policansky .................. | 131/61(A) |
| 3,364,934 | 1/1968 | Molins......................... | 131/61(A) |
| 3,410,278 | 11/1968 | Verbakel...................... | 131/20(A) |

FOREIGN PATENTS

| 536,525 | 10/1931 | Germany...................... | 131/61(A) |
| 1,106,229 | 5/1961 | Germany...................... | 131/61(B) |

Primary Examiner—Samuel Koren
Assistant Examiner—James H. Czerwonky
Attorney—Sughrue, Rothwell, Mion, Zinn & MacPeak ABSTRACT: An arrangement in a machine for manufacturing cigar bunches to produce an interrupted rod of tobacco, said rod including portions covered with tobacco alternating with portions lacking tobacco. The arrangement comprises a feed means and a conveying belt means, said feed means continuously passing tobacco to the conveying belt means. A continuous chain conveyor is arranged below the feed means and in the tobacco flow from said feed means but above the conveying means. The chain conveyor has a plurality of tobacco-collecting containers arranged with a uniform spaced relationship. The chain conveyor moves in a plane perpendicular to the transverse dimension of the conveying means and also moves synchronously with said conveying means. The distance between two adjacent containers is equal to the length of a desired cigar.

DEVICE IN A MACHINE FOR PRODUCING CIGAR BUNCHES OR CIGARS

A DEVICE IN A MACHINE FOR PRODUCING CIGAR BUNCHES OR CIGARS

The present invention is concerned with an arrangement in the manufacture of cigar bunches or cigars for producing an interrupted rod of tobacco, comprising portions of tobacco arranged in spaced relationship and in which the tobacco is continuously supplied to a conveying means, such as a conveyor belt for instance, on which the tobacco rod is formed.

In the preparation of cigar bunches a method is used in which a continuous rod of cigar bunches is formed. The rod is cut into requisite lengths. A certain quantity of tobacco is then drilled out from the end or ends of the bunch, whereafter the cigar ends are formed. In another method, which also employs the production of a continuous tobacco rod, a certain quantity of tobacco is removed from the positions on the rod, where cutting is to be effected, and extra tobacco is added to those parts of the rod, which are to constitute bunches. Cutting is then effected at those portions, where tobacco has been removed, whereafter the ends are formed. In another method bunches are used, which have been produced in a special machine, which are provided with a casing of stripped tobacco. The bunches are placed in the casing in certain spaced relationship. The resulting rod is then cut within the area between the bunches, whereafter the ends of the bunches are formed.

The aforedescribed methods are relatively complicated and time consuming and there is a general desire to simplify the preparation of bunches by forming directly a continuous tobacco rod, where the tobacco is present in lengths, which correspond to the length of the desired bunch, and where between each tobacco length there is found a region on the rod, in which there is no tobacco at all. The object of the present invention is to provide an arrangement in cigar bunch making machines, which enables such a continuous tobacco rod to be produced.

The arrangement according to the invention is mainly characterized in that arranged in the path of the flow of tobacco on the feeding arrangement are collecting means spaced in uniform relationship, said means being arranged at least in part to move synchronously with the conveyor belt, wherewith the distance between two adjacent means is substantially equally length of the desired bunches.

The invention will now be described with reference to accompanying drawings: where FIG 1 shows a section in longitudinal direction through one embodiment;

Figure 1:
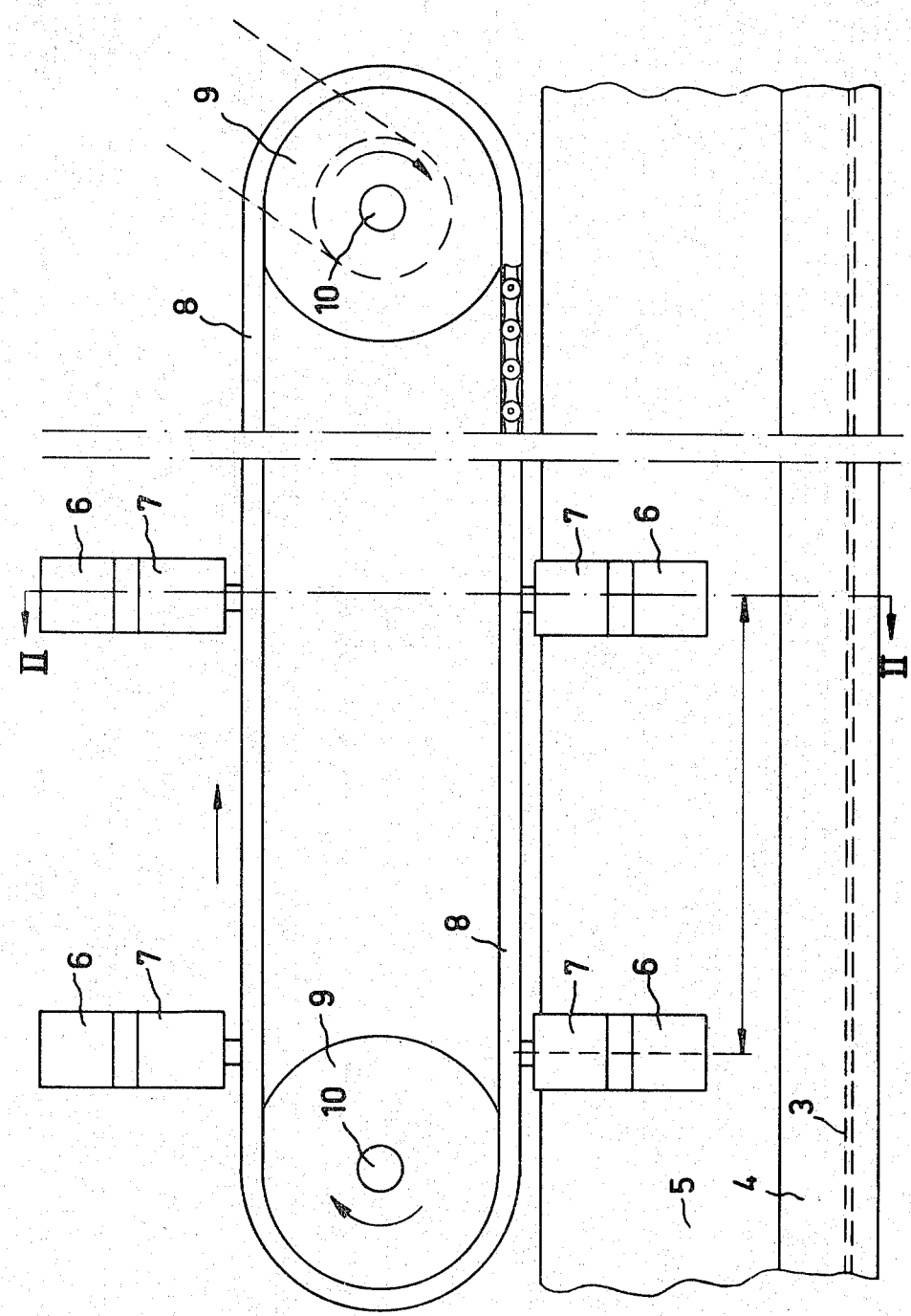
Figure 2:
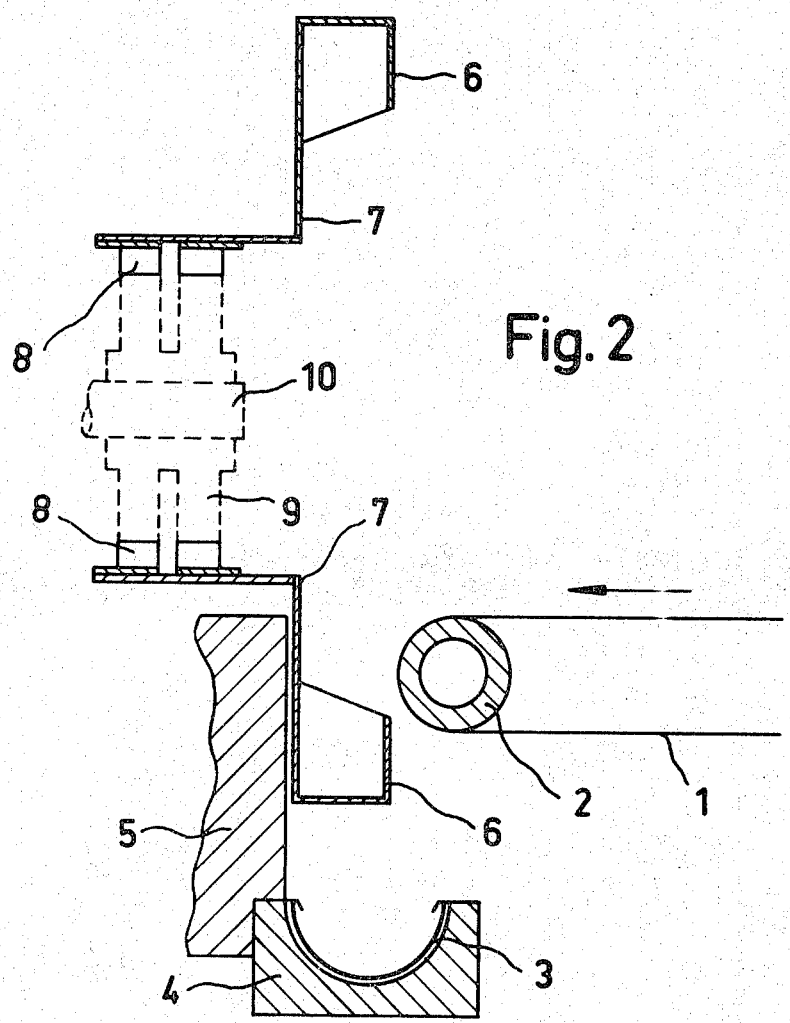
FIG. 2 shows a section in the transverse direction through the same embodiment.

An embodiment in accordance to the invention is shown in FIGS. 1 and 2. The chute in the rod-making machine, in which the tobacco rod conveyor belt 3 is arranged is shown in the Figures. The chute is formed in the machine part 4, which is secured to the frame 5. The tobacco, which is to form part of the cigar bunch, is advanced from a magazine by a conveyor belt 1, which passes around a bridle roller 2. The roller 2 is so arranged that its longitudinal direction is parallel with the longitudinal direction of the belt 3. The roller 2 is also so positioned that the tobacco, when it leaves the conveyor belt 1, falls down onto the belt 3.

Figure 3:
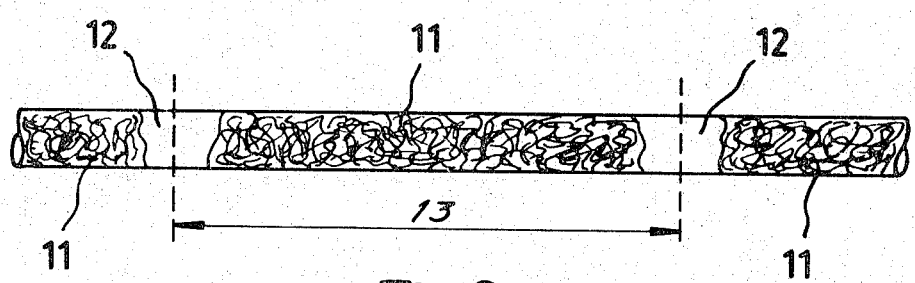
FIG. 3 shows the appearance of the continuous tobacco rod, obtained by means of the apparatus.

Arranged in a plane perpendicular to the conveyor belt 3 is a chain 8 passing over bridle rolls 9, which are arranged on shafts 10. On one of said shafts is arranged a drive wheel for driving the chain 8. Arranged in uniform space relationship on the chain 8 are holder means 7, to which are fastened containers 6. Each container is provided with an opening. The opening of the containers face each other. The chain 8 is driven in such a way that its movement becomes synchronized with the movement of the belt 3. When the containers 6 on the belt 3 pass at the same speed under the conveyor belt 1 a portion of the tobacco, which flows down from said belt, will be caught by the container 6. Consequently a tobacco rod is obtained on belt 3, which is interrupted at both positions located below the containers. The appearance of the tobacco rod is shown in FIG. 3. Thus, a rod is obtained presenting tobacco portions 11 and portions 12, which completely lack tobacco. The distance 13 between the two portions which lack tobacco correspond to the distance between the centerlines through two adjacent containers 6.

The length of the tobacco portion 11 corresponds to the length of a desired cigar bunch. The distance between the containers 6 has been chosen bearing in mind that a certain amount of tobacco will always fall down at the ends of portion 11, so that the length of said portion 11 is essentially that desired. Different widths of the portion 12 can be obtained by varying the width of the containers. The width of said portion 12 can also be varied by positioning the containers at different heights above the rod belt 3. A sloping chute is arranged at the side of the bridle roller 9 over which the filled container passes and between the parallel portions of the chain 8. The content of the container 6 falls into the chute when the container is turned during the rotation of the chain around said roller 9. The collected tobacco in the chute then passes to a conveyor means which feeds the tobacco back to the store. The tobacco in the chute can also be fed to the tobacco store by means of a suction.

Figure 4:
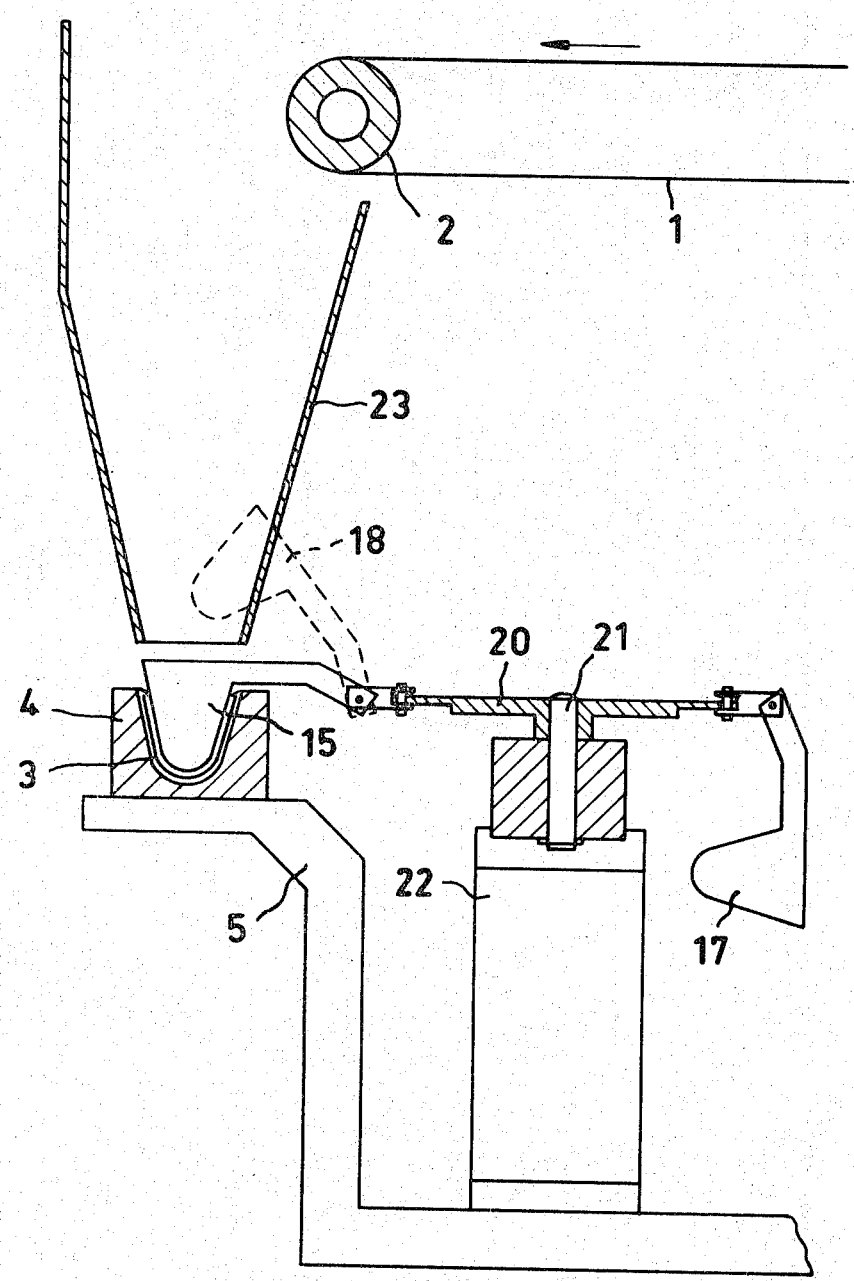
FIG. 4 shows a section in the longitudinal direction through a second embodiment.
Figure 5:
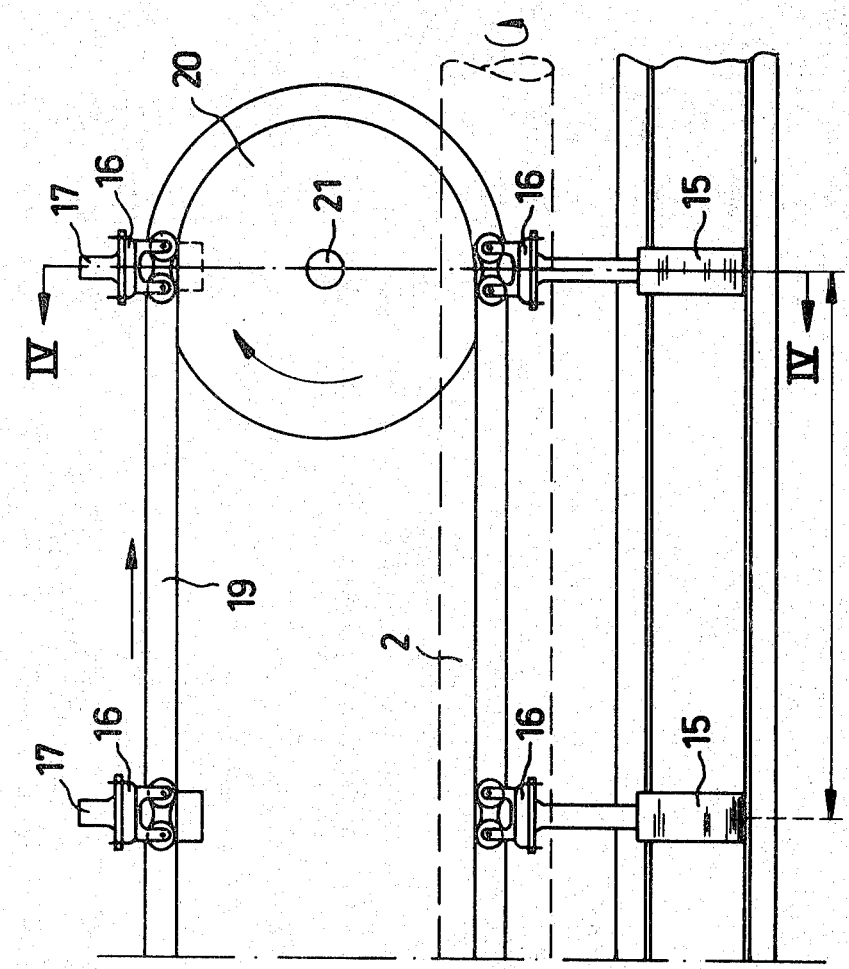
FIG. 5 shows a section in the transverse direction through said second embodiment.

FIGS. 4 and 5 show another embodiment of the invention. The flow of tobacco from the conveyor belt 1, which passes over a bridle roller 2, is passed through a chute 23 towards the belt 3. This belt is arranged in a chute in the machine part 4 in the frame 5. The belt 1 is so arranged that its front edge is parallel with the longitudinal direction to the belt 3. The containers 15 are also used in this embodiment to catch portions of the tobacco flow from the belt 1.

The containers 15 are arranged on a chain 19 by the holder members 16. The chain passes around bridle rollers 20, which are arranged on shafts 21, which are journalled in the machine part 22 of the frame 5. Arranged on one of said shafts is also a drive wheel for driving the chain. The chain, in this embodiment, is arranged in a frame, which is parallel with the plane of the rod belt 3. The movement of the chain 19 is synchronized with the movement of the belt 3.

The containers 15, which are arranged on the chain, are so positioned that they are located immediately above the belt 3 along the greater portion of the path, which the belt and chain pass parallel to one another. The openings of the containers 15 are faced towards the bottom of a chute 23. Similarly to the previous embodiment the containers catch portions of the falling tobacco so that an interrupted tobacco rod is obtained, presenting portions, which lack tobacco completely.

When the container during movement along the belt 3 approaches the bridle roll 20 of the chain the containers are lifted from the belt, as shown in FIG. 4. One container, which has adopted the lifted position, is shown in FIG. 4 with dash lines, and is identified with the reference numeral 18. The containers are emptied on passage round the wheel 20, the content of the container falling down into a chute, from which the tobacco, by means of a conveyor belt or a suction means, is fed back to the tobacco store, as in the FIGS. 1 and 2 embodiment. During the subsequent movement between the wheels 20 the containers adopt a depending position, as shown in FIGS. 4 and 5 and which have been indicated with reference numeral 17. When the containers have passed the second bridle roller 20 they are relifted up over the machine part 4 and replaced immediately above the belt 3.

Vertical movement of the containers is guided by means of guide structures, which are arranged adjacent the chain and against which holder arms 16 of the containers abut during the circulatory movement of the chain. The guide structures are not shown in the FIGS.

As previously mentioned, an interrupted rod is also obtained with this embodiment, the rod comprising alternate portions covered with tobacco and portions, which lack tobacco complete. Because the containers are placed immediately adjacent the rod belt the fall of tobacco at the ends of the covered portions is less, and hence the length of this portion can easily be maintained constant. By suitably inclining one or both of the ends of the containers the amount of tobacco at the ends of the covered portion can be varied, which is necessary when the cigar bunch has a form other than a straight cylindrical shape. Instead of planar surfaces the ends of the containers may be given another design. They can, for instance, be bulged outwardly.

Figure 6:
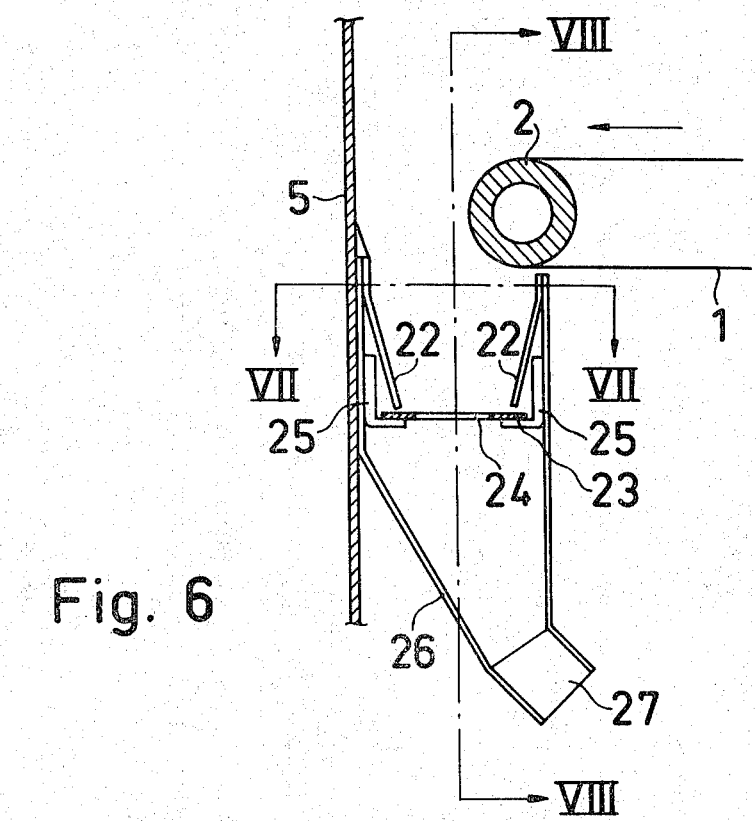
FIG. 6 shows a section in the transverse direction through a third embodiment.
Figure 7:
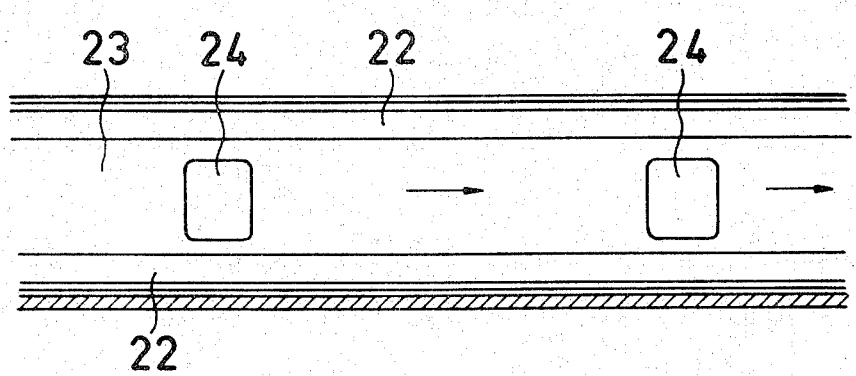
FIG. 7 shows this embodiment seen from above.
Figure 8:
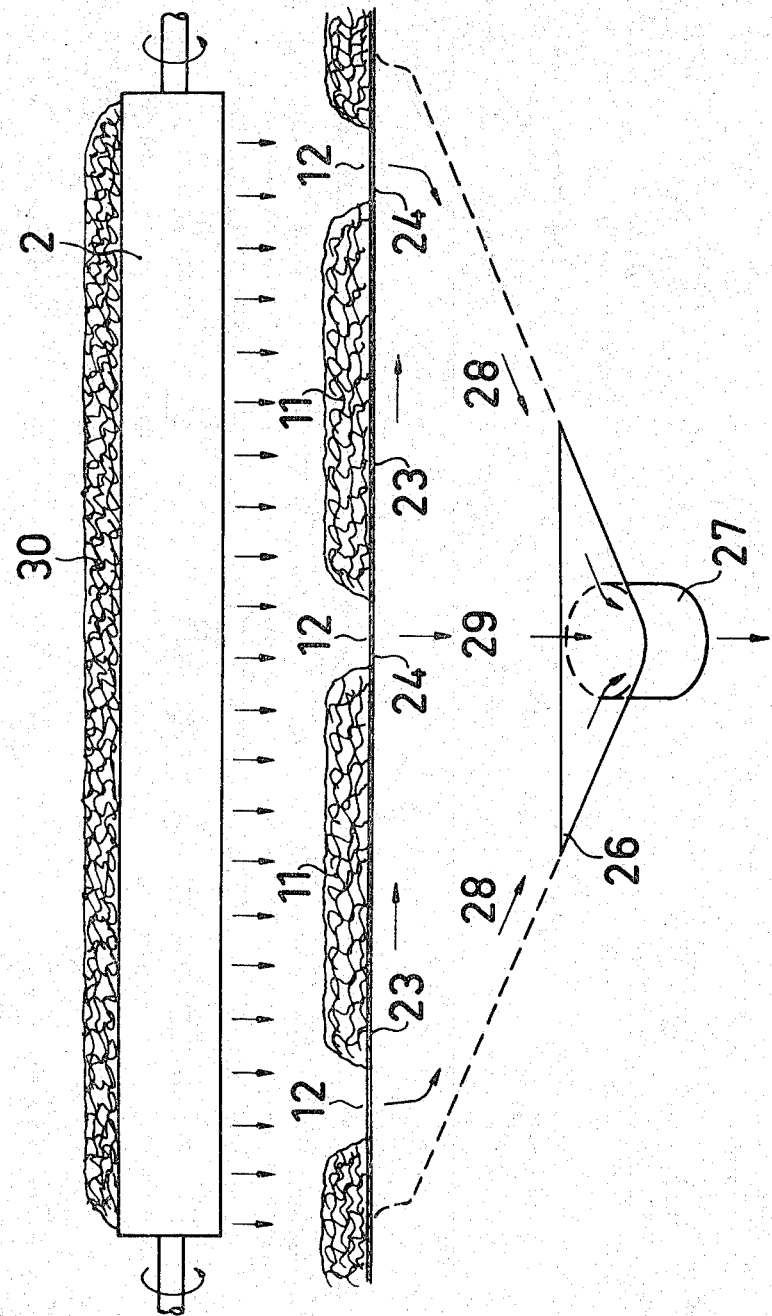
FIG. 8 shows a section in the longitudinal direction through the third embodiment.

FIGS. 6, 7 and 8 show a third embodiment of the invention. FIG. 6 shows a section through the arrangement in the transfer direction thereof, FIG. 7 shows the arrangement seen in plan view through a section VII–VII and FIG. 8 shows a section VIII–VIII in the longitudinal direction of the arrangement.

As can be seen from FIG. 6 the frame is provided with a funnel-shaped member 26. This member is situated below the roller 2, around which the conveyor belt 1 passes and is adapted to catch the flow of tobacco fed by the belt 1. A belt 23 is adapted to pass on two like members 25. The direction of movement of the belt 23 is perpendicular to the movement direction of the belt 1. Arranged in the funnel-shaped member 26 are two guide plates 22, which guide the falling flow of tobacco towards the belt 23. Disposed in uniform spaced relationship in the belt 23 are holes 24, which permit a portion of the tobacco flow to pass through the belt and down onto the member 26. At the lower end 27 of said member 26 is connected a suction means (not shown), which removes the fallen tobacco and returns it to the magazine. Because of the holes 24 in the belt 23 an interrupted tobacco rod is obtained on said belt, as shown in FIG. 8. The tobacco conveyed by the belt 1 falls down onto the belt 23 and there forms tobacco rods 11, which are separated by empty sections 12. The tobacco which passes through holes 24 is sucked out through the opening 27, as shown in FIG. 8 by arrows 28 and 29. The distance between two adjacent holes 24 is selected so that the length of the obtained rod 11 corresponds to the length of the desired cigar bunch or cigar.

In the aforegoing has been described how the device according to the invention is used for producing cigar bunches. It is, however, also possible to apply the same device for producing cigars.

I claim:

1. An arrangement in a machine for manufacturing cigar bunches to produce an interrupted rod of tobacco having portions completely lacking tobacco, said arrangement comprising:

a. feed belt means and conveying belt means, said feed belt means being above and adapted to continuously pass a tobacco flow to said conveying belt means from a store of tobacco;

b. continuous chain conveyor means movable in a plane perpendicular to the transverse dimension of said conveying belt means and in synchronization with said conveying belt means; and c. a plurality of tobacco-receiving containers depending from said chain conveyor means, each of said containers having end walls spaced-apart in the longitudinal direction of said conveying belt means and a bottom portion extending between said end walls and spaced above said conveying belt means and below said feed belt means, said containers being spaced-apart on said chain conveyor means a distance equal to the length of a desired cigar bunch, said containers further being movable into a position to intercept and collect portions of said flow of tobacco between said feed belt means and said conveying belt means to thereby divide the tobacco on said conveying belt means into said desired cigar bunches.